US006665657B1

(12) United States Patent
Dibachi (10) Patent No.: US 6,665,657 B1
(45) Date of Patent: Dec. 16, 2003

(54) METHOD AND SYSTEM FOR CROSS BROWSING OF VARIOUS MULTIMEDIA DATA SOURCES IN A SEARCHABLE REPOSITORY

(75) Inventor: Rhonda Dibachi, Los Altos, CA (US)

(73) Assignee: Niku Corporation, Redwood City, CA (US)

( * ) Notice: Subject to any disclaimer, the term of this patent is extended or adjusted under 35 U.S.C. 154(b) by 0 days.

(21) Appl. No.: 09/444,240

(22) Filed: Nov. 19, 1999

(51) Int. Cl.[7] ............................................... G06F 17/30
(52) U.S. Cl. ....................... 707/3; 707/4; 707/5; 707/10
(58) Field of Search ............................. 707/8, 10, 100, 707/103, 200, 1–3, 103 R, 4–5; 17/30

(56) References Cited

U.S. PATENT DOCUMENTS

| | | | | |
|---|---|---|---|---|
| 5,345,586 A | * | 9/1994 | Hamala et al. | 707/10 |
| 5,913,214 A | * | 6/1999 | Madnick et al. | 707/10 |
| 5,963,949 A | * | 10/1999 | Gupta et al. | 707/100 |
| 6,006,225 A | * | 12/1999 | Bowman et al. | 707/10 |
| 6,061,692 A | * | 5/2000 | Thomas et al. | 707/200 |
| 6,088,694 A | * | 7/2000 | Burns | 707/8 |
| 6,144,958 A | * | 11/2000 | Ortega et al. | 707/10 |
| 6,151,601 A | * | 11/2000 | Papierniak et al. | 707/1 |
| 6,169,986 B1 | * | 1/2001 | Bowman et al. | 707/10 |
| 6,185,558 B1 | * | 2/2001 | Bowman et al. | 705/37 |
| 6,195,662 B1 | * | 2/2001 | Ellis et al. | 707/103 |
| 6,199,077 B1 | * | 3/2001 | Inala et al. | 704/1 |
| 6,236,994 B1 | * | 5/2001 | Swartz et al. | 707/101 |
| 6,237,011 B1 | * | 5/2001 | Ferguson et al. | 707/515 |
| 6,253,239 B1 | * | 6/2001 | Shklar et al. | 707/10 |
| 6,256,627 B1 | * | 7/2001 | Beattie et al. | 707/6 |
| 6,275,824 B1 | * | 8/2001 | O'Flaherty et al. | 707/10 |
| 6,278,993 B1 | * | 8/2001 | Kumar et al. | 707/3 |
| 6,308,178 B1 | * | 10/2001 | Chang et al. | 707/100 |
| 6,327,594 B1 | * | 12/2001 | Van Huben et al. | 707/10 |
| 6,353,823 B1 | * | 3/2002 | Kumar | 707/102 |
| 6,385,600 B1 | * | 5/2002 | McGuinness et al. | 707/3 |
| 6,385,602 B1 | * | 5/2002 | Tso et al. | 707/3 |
| 6,401,084 B1 | * | 6/2002 | Ortega et al. | 704/5 |
| 6,457,002 B1 | * | 9/2002 | Beattie et al. | 707/3 |
| 6,582,474 B2 | * | 6/2003 | LaMarca et al. | 715/500 |

FOREIGN PATENT DOCUMENTS

WO    WO 9745800    * 12/1997 ............ 17/30

OTHER PUBLICATIONS

Burns, Randal; Narang Inderpal; "Version Management and Recoverability for Large Object Data" IEEE, Multimedia Database Management Systems, Aug. 1998, Proceedings. International Workshop On pp.: 12–19.*

* cited by examiner

Primary Examiner—Greta Robinson
Assistant Examiner—Debbie M. Le
(74) Attorney, Agent, or Firm—Blakely, Sokoloff, Taylor & Zafman LLP (57) ABSTRACT

The present invention introduces a system and method for organizing, storing, retrieving and searching through binary representations of information in many forms and formats. Data is stored in its original file format, while maintaining metadata about the data items in a relational database. During searches the system utilizes the metadata to invoke data translators of the appropriate type to present data to the search engine itself. In addition, the system utilizes profiles and access control lists to restrict access to data to authorized users.

23 Claims, 5 Drawing Sheets

METHOD AND SYSTEM FOR CROSS BROWSING OF VARIOUS MULTIMEDIA DATA SOURCES IN A SEARCHABLE REPOSITORY

FIELD OF THE INVENTION

The present invention relates to the field of data management. In particular the present invention discloses a system and method for browsing of various data sources in a searchable knowledge repository.

BACKGROUND OF THE INVENTION

Professional services organizations require efficient handling and organization of the vast amounts of documents and data they generate. Often times companies take on large consulting projects for clients. Throughout these projects numerous documents are generated in every stage. For example, a company may generate a proposal to a company of the services that it will render. More documents will be generated if the client accepts the proposal and requires the company to generate documents pertaining to its contract services. Documents will be generated regarding budgetary information and guidelines for carrying out the project. This deluge of documents are typically stored and archived. While working on a project proposal, a user may remember another project proposal from which valuable information is contained. Finding the document among the plethora of files is very time consuming and inefficient. The documents have little meaning archived since their contents are typically not fully reflected in their naming convention. As time, days and years pass, the likelihood of remembering which files contained what valuable information decreases. Furthermore, a change in personnel often means that knowledge of which files contained what data leaves with personnel changes. Companies need a system to organize, store, retrieve and search all of their documents from the proposal stage through the completed project stage. Companies need a system to keep track of which project(s) each of their consultants are working on as well as aid in managing the projects.

SUMMARY OF THE INVENTION

A system and method for browsing various data sources in a searchable knowledge repository is disclosed. In one embodiment, the method includes storing data sources in a database and maintaining metadata for each data source in a relational database. The data sources are heterogeneous in that they may be created from numerous applications. The metadata contains essential structured information related to a specific data source. Using the metadata combined with the data source, the method through a single search request scans data items of any format such as audio, image, facsimile as well as ASCII text.

BRIEF DESCRIPTION OF THE DRAWINGS

The objects, features and advantages of the present invention will be apparent to one skilled in the art in view of the following detailed description in which.

DETAILED DESCRIPTION

A method and system for browsing of various data sources in a searchable knowledge repository is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to documentary data. However, the same techniques can easily be applied to other types of data such as voice and video.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Figure 1:
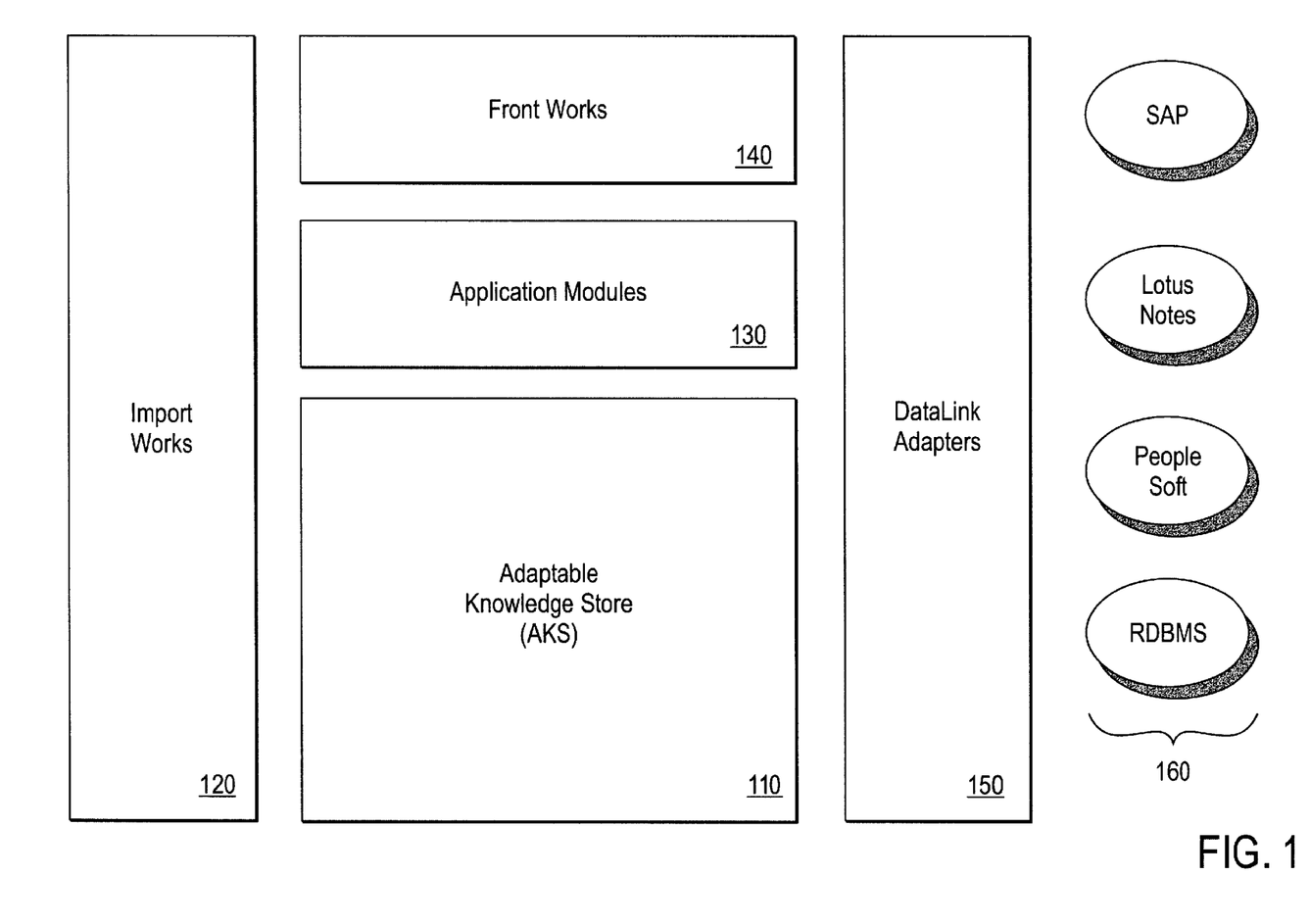
FIG. 1 is a block diagram of one embodiment of a system.

FIG. 1 is a block diagram of one embodiment of a browsing system in block diagram form. The central block of the system is the Adaptable Knowledge Store (AKS) (110). AKS (110) communicates with a multitude of applications (160) through the Datalink Adapters (150). Through the Application Modules (130), AKS (110) communicates with Frontworks (140). Frontworks (140) provides an user interface to access AKS (110). Such accessing of AKS (110) could include searching, retrieving and updating AKS' (110) structure and file system. AKS (110) is also linked to Import Works (120) for the importation of data sources from outside such as facsimile, e-mail, voice mail, etc.

Adaptable Knowledge Store

Figure 2:
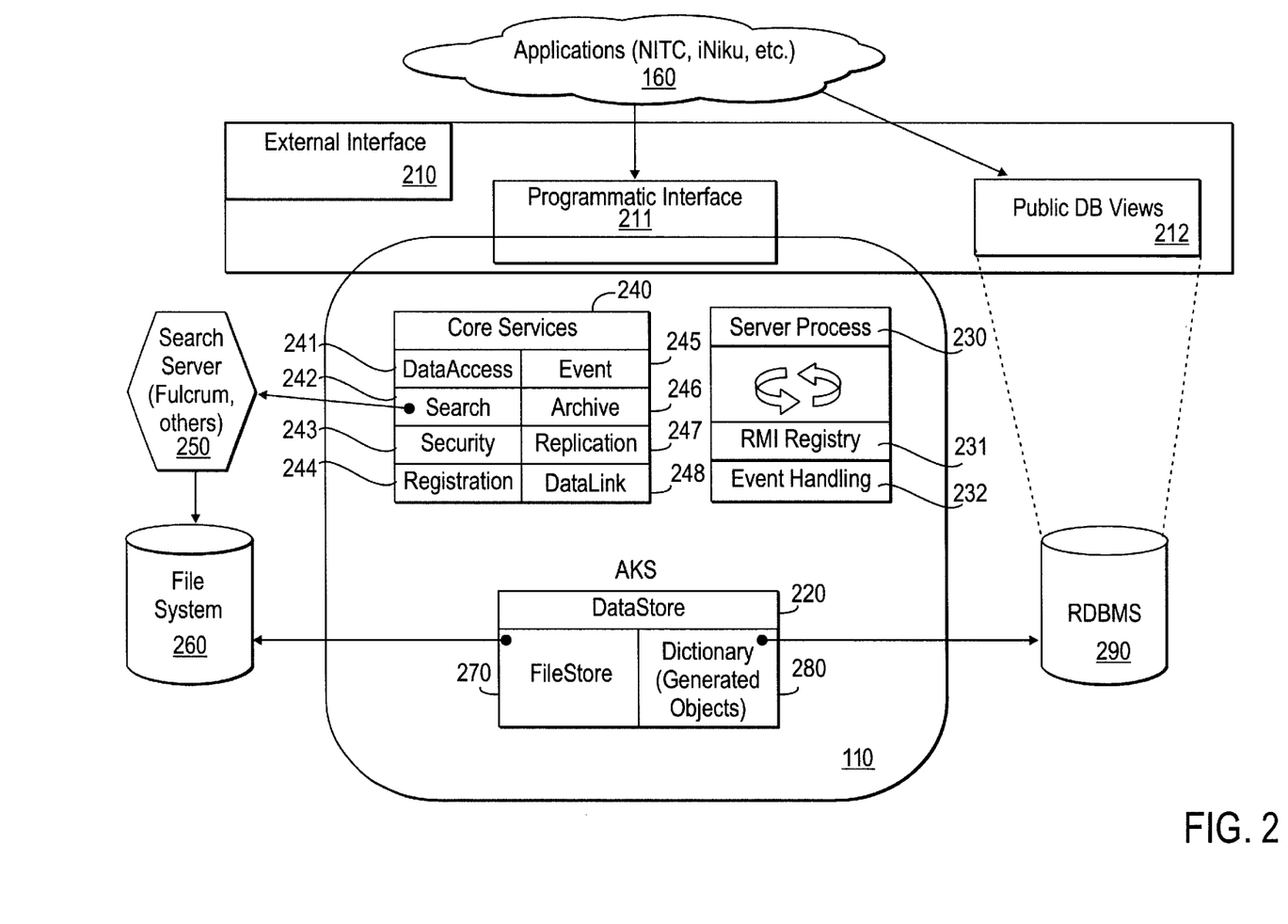
FIG. 2 is a block diagram of one embodiment of the Adaptable Knowledge Store (AKS).

FIG. 2 is a block diagram of one embodiment of AKS (110). AKS (110) is composed of four major components:
1) An External Interface (210),
2) A DataStore (220);
3) A Server (230); and
4) Core Services (240).

The External Interface (210) provides a link to external applications (160) such as SAP™, Lotus Notes™, People Soft™ and RDBMS™. It also acts as a barrier through which application developers interact with AKS (110). The External Interface (210) serves two purposes; namely to shield application developers from needing to understand the low-level AKS (110) implementation and to protect AKS (110) from inappropriate use. The External Interface (210) is composed of two components: a Programmatic Interface (API) (211) and a Public Database Views (212). API (211) defines a set of methods to enable external interaction with AKS (110). API (211) provides services to handle data input and output, data discovery and manipulation, archiving and replication, searching, privilege management and application installation and management. The methods may be created with any programming language for example Java. API (211) is available to applications (160) both as Java library methods and as remotely accessible interfaces through Remote Method Invocations (RMIs). This availability allows flexibility in structuring and distributing the application architecture. In one embodiment, API (211) has the same methods and signatures whether accessed through Java library methods or through remotely accessible interfaces. In one embodiment, API (211) requires a login and returns an authentication token. This token is required by all methods of interaction with AKS (110) in order to identify and prove the validity and authorization of the user. After confirming the authorization of the user, API (211) calls an appropriate Core Service (240) for the user's desired functionality. The Core Services are described in greater detail below. The second component of the External Interface (210) is Public Database Views (PDV) (212). PDV (212) is implemented to guarantee safe, read only access to certain subsets of AKS (110) known as data tables. These views allow applications built on top of AKS (110) to create database queries that join the application's data tables with AKS (110) data tables. Aggregate operations are handled by AKS (110) in one step, rather than dividing the operation across multiple database queries and combining large intermediate data sets. PDV (212) shields application developers from being tied too closely to a particular AKS (110) scheme so that developers access AKS (110) through API (211) instead. PDV (212) presents data in terms of external AKS (110) functionality, rather than simply exposing the internal AKS (110) database data. If the AKS (110) information is altered, PDV (212) automatically reflects that change.

The DataStore (220) is a repository for the FileStore (270) and a Dictionary (system tables) (280). Each FileStore (270) is placed in the DataStore (220) with a location in a hierarchy of folders. These folders are created and defined by users, with one exception. In one embodiment, the root folder of the DataStore (220) containing the hierarchy information is automatically provided by AKS (110) and may not be altered or removed by any user. The FileStore (270) manages heterogeneous data sources, which are stored in the hierarchy of folders. The physical location of the data sources is secure from unauthorized access through the hierarchy of folders. Thus, access to the data sources may only be achieved through API (211). The physical locations and filenames of the data sources have no relevance outside the file system. The data sources are stored in the file system using a folder structure that avoids operating system performance bottlenecks, which might be caused by too many files or subdirectories in a single directory. This folder structure simplifies the replication process. The dictionary (280) contains the metadata (410) needed to provide a context for the data sources as well as for any applications (160) that are built on top of AKS (110). The dictionary (280) stores objects representing data sources and their corresponding folders, thus organizing and extending the data sources within the FileStore (270). It also stores a set of system and custom-defined attributes describing the data sources. The dictionary (280) stores all of the support entities of AKS (110), such as User, Group, Search, and Event information. It stores system attributes for these objects, as well as custom-defined attributes for a subset of them.

The Server (230) is a real-time component from which independent system threads are managed. These threads are the Remote Method Invocation (RMI) Registry (231) and Event Handler (232). The RMI Registry (231) starts a registry server to listen for incoming RMI requests and then connect the Remote Interfaces to the server. The Event Handler (232) manages events such as measurable milestones of projects. The types of events that are handled by the Event Handler (232) are a specific Date/Time, certain File Deletion and a specific User Login to name a few. An application (160) may register interest in an event. When registering interest in the event, the application (160) provides an action to be taken when the specific event occurs. An action is the operating-system specific script to be initiated upon the occurrence of the given event. This script is handed one system-defined and application-defined parameter at initiation. The exact content of the system-defined parameter varies as appropriate to the event, and is documented with the event type. The information in the application-defined parameter is provided by the application at event registration, and is opaque to AKS (110). When a system event occurs, AKS (110) immediately compares that event to the event registry table to see if the application (160) has registered interest in the event. Any matching events found are added to the event queue table, along with any other appropriate parameters. The Event Handler (232)

monitors the event queue table. As new events are added to the queue, the Event Handler (232) extracts them from the queue and executes the associated application-provided script. The Event Handler (232) runs in an independent thread to ensure that the script execution does not increase the latency of a request from API (210) signaling the event.

Finally, AKS (110) provides Core Services (240), which are libraries to fulfill requests from API (211). Core Services (240) provide the actual functionality behind API (210) requests for specific applications (160). The libraries contain the business logic that characterizes the services available, both publicly and privately, to the application (160). The Core Services (240) can be broken down into eight distinct service groups: Data Access Services (241), Search Services (242), Security Services (243), Registration Services (244), Event Services (245), Archival Services (246), Replication Services (247), and DataLink Services (248). Data Access Services (241) control access to the data sources and attributes in the DataStore (220). They allow applications (160) to view and manipulate data sources and folders. Search Services (242) control access to the registered search engines. They allow applications to perform ad-hoc searches on the FileStore (270). Security Services (243) control the security aspects of AKS (110). They allow applications (160) to login and logout, view and manipulate Users and Groups, and assign, list, and manipulate privileges on data sources and Folders. Registration Services (244) allow an application (160) to customize the system by registering Search Engines, DataLinks and custom attributes for data sources and Users. Event Services (245) allows an application (160) to specify scripts that will be initiated by specific system events. Archival Services (246) allow an application (160) to archive and restore all of the data in the DataStore (220). Replication Services (247) allow an application (160) the ability to replicate AKS (110) or a subset thereof, limited to a single data source, a single folder, or a set of data sources filtered by File Attribute comparisons. DataLink Services (248) control access to the registered DataLinks. They allow AKS (110) to exchange data through links to external data sources.

DataLink Adapters

The DataLink Adapters (150) have two stages of activity, initialization and operation. During the initialization phase, the taxonomy of the external data repository is mapped. Metadata (410) regarding the data items in the external repository is generated and stored in AKS (110). The information in this metadata (410) layer enables read (and search) access to the external data through API (210). The metadata (410) mapping is refreshed, either on a periodic basis, or on an event driven basis. This choice is user definable. After initialization, the DataLink adapters (150) enter the operation phase. In this phase the DataLink adapters (150) provide API (210) an interface allowing AKS (110) access to the data items contained in the external repositories. Utilizing DataLink adapters (150) in this fashion allows AKS (110) to provide full search and retrieval of multimedia data items contained in various external repositories. A central directory and Dictionary (280) containing the metadata (410) and logic contained in AKS (110), mediates this access.

Source Data Flow

Figure 3:
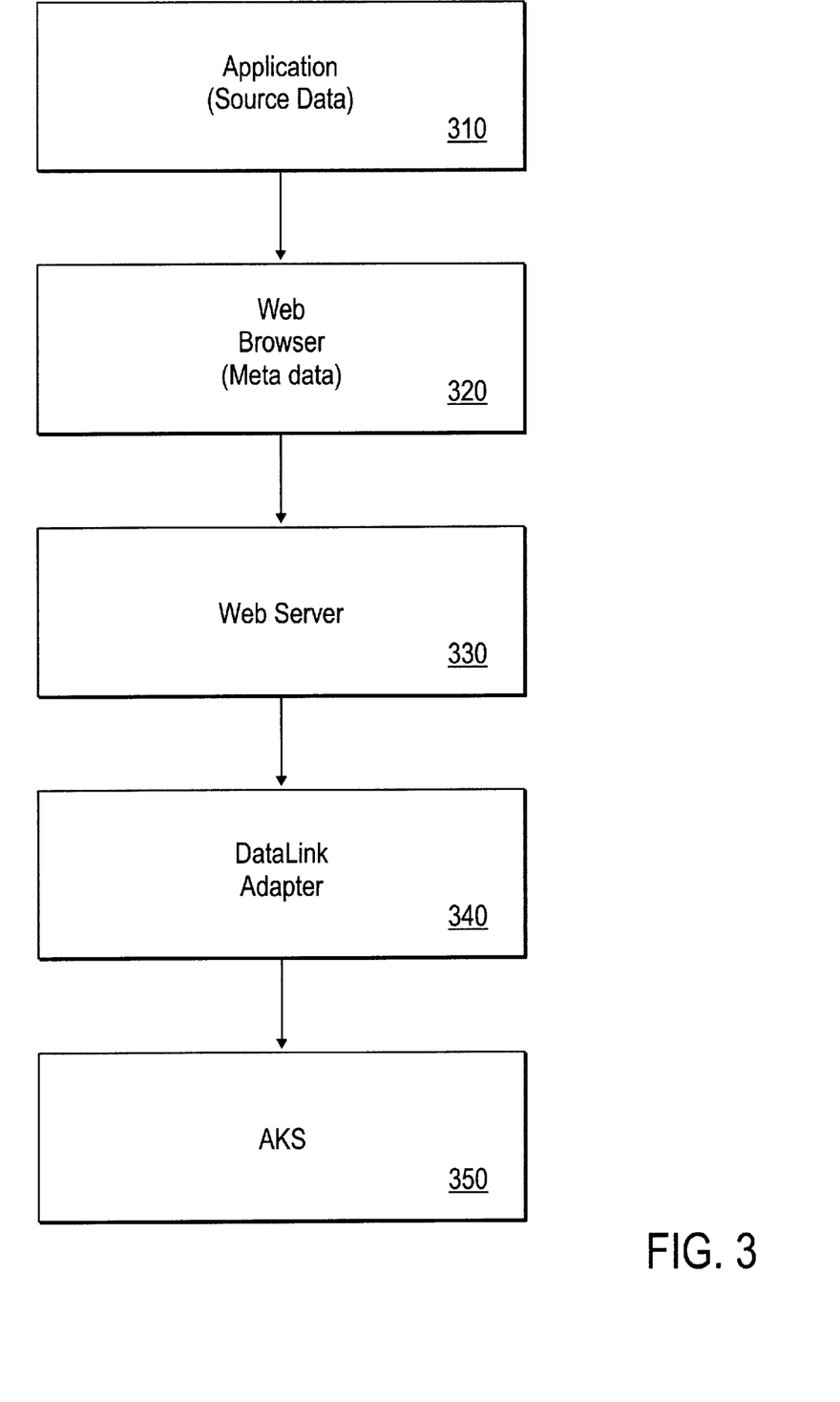
FIG. 3 is a flow diagram of one embodiment of a process for placing source data, such as a word processing document, within AKS.

FIG. 3 is a flow diagram of a process for placing source data (420), such as a word processing document, within AKS (110). The process as performed by processing logic, which may comprise hardware, software, or a combination of both. Referring to FIG. 3, in step 310, a user creates the source data (420) using application (160). This source data (420) is tagged in step 320 with metadata (410) through a web browser based system interface. Both the metadata (410) and source data (420) are handled by the web server in step 330. In step 340, the DataLink Adapter specific to the application (160) translates the metadata (410) and source data (420) into a form suitable for AKS (110) as described in detail above. Finally in step 350, AKS (110) stores the metadata (410) and source data (420).

Figure 4:
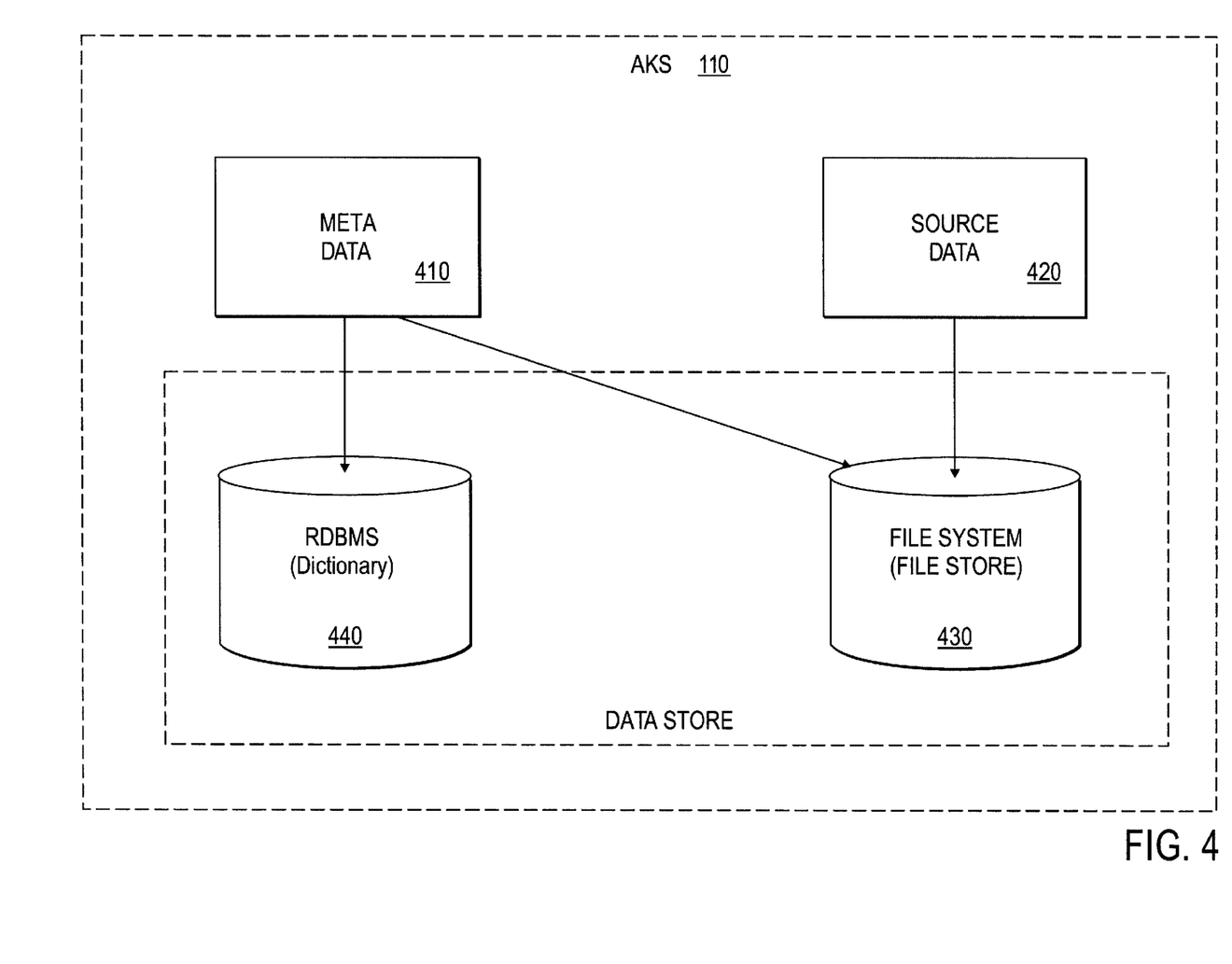
FIG. 4 is a block and flow diagram depicting storage of metadata and source data by AKS.

FIG. 4 is a block and flow diagram depicting storage of metadata (410) and source data (420) by AKS (See step 350 in FIG. 3). AKS (110) receives both source data (420) and its associated metadata (410). The metadata (410) is stored in the Relational Database Management System (RDBMS) (440). RDBMS (440) also stores all the Dictionary (280) information detailed above. The metadata (410) and source data (420) are stored in the FileStore (430) and its location and name are saved within the Dictionary (420).

Figure 5:
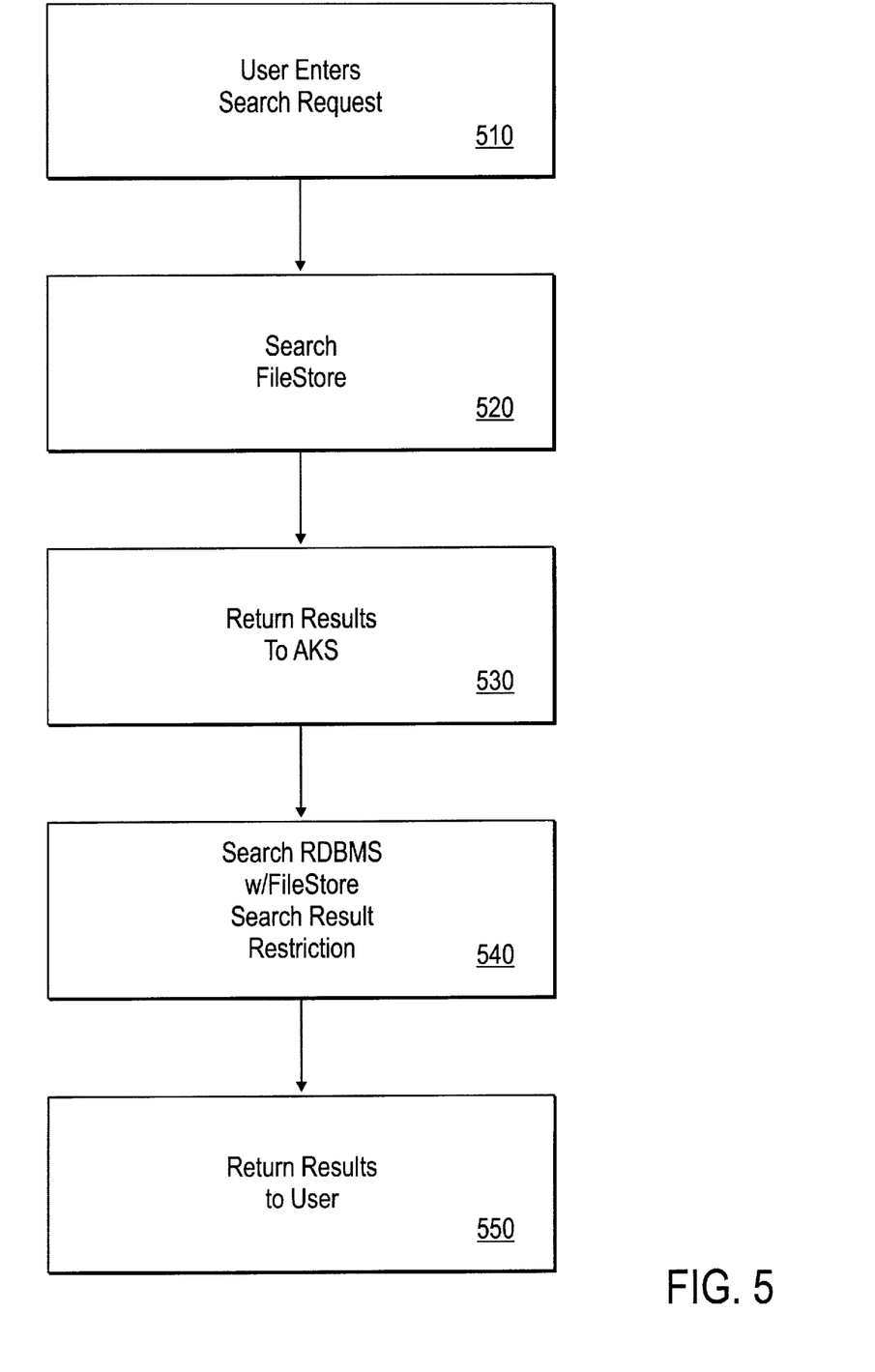
FIG. 5 is a flow diagram of one embodiment of a process for handling a search request.

FIG. 5 is a flow diagram of one embodiment of a process for handling a search request by AKS (110). In step 510, a user enters a search request such as Proposals from January to February of 1998 containing the word "Magic." Thus the user has provided a document search request with date restrictions. FileStore (430) is first searched for documents containing the word "Magic" (520) and returns all Proposals with the word "Magic" (530). Step 540 then searches the RDBMS (440) for documents with the date restriction within the documents resulting from the FileStore search (520). The results of the RDBMS search are then returned to the user in step 550. The RDBMS search (540) can search through any structured information such as the proposal name, client, start date, end date and status of project. AKS (110) utilizes two separate search engines, one specific for the document type (eg. MS Word, Excel, etc.) and another search engine specific for the RDBMS. Thus, the process seamlessly provides the user with search results of a combination of the document and RDBMS search.

The foregoing has described a system and method for browsing of various data sources in a searchable knowledge repository. It is contemplated that changes and modifications may be made by one of ordinary skill in the art, to the materials and arrangements of elements of the present invention without departing from the scope of the invention.

I claim:

1. A method for storing data in a data storage system, comprising:
   gathering source files from one or more applications;
   providing metadata associated with the source files;
   tagging the source files with the metadata to generate tagged files;
   transmitting the tagged files over a network to an adaptable knowledge store;
   storing the tagged files in the adaptable knowledge store, wherein both the metadata and the source files of the tagged files are searchable via a single search command.

2. The method of claim 1, further comprising transmitting the source files and metadata from an external application to the adaptable knowledge store via a datalink adapter.

3. The method of claim 1, further comprising storing the metadata in the adaptable knowledge store.

4. The method of claim 1, further comprising:
   organizing the tagged files within the adaptable knowledge store; and
   managing the tagged; files within the adaptable knowledge store.

5. The method of claim 1, further comprising:
accessing the tagged files within the adaptable knowledge store;
searching the tagged files within the adaptable knowledge store;
securing access to the adaptable knowledge store;
registering application preferences;
initiating automatically a process to be executed within the adaptable knowledge store upon the occurrence of a predetermined event;
archiving the tagged files within the adaptable knowledge store;
replicating the tagged files within the adaptable knowledge store; and
regulating data transfer between an external application and the adaptable knowledge store.

6. The method of claim 1, further comprising:
accessing from an externally application the adaptable knowledge store; and
displaying externally the tagged files contained within the adaptable knowledge store.

7. A method for retrieving data from a data storage system, comprising:
submitting search parameters to the data storage system;
processing search parameters with a first search engine associated with a metadata datastore;
automatically providing first search results from the first search engine to a second search engine, wherein the first search results are a list of files;
processing search parameters and first search results with the second search engine associated with a source data datastore; and
returning results of the second search engine, wherein the results of the second engine are a subset of the list of files provided by the first search engine.

8. A system for storing data comprising:
means for gathering source files from one or more applications;
means for providing metadata associated with the source files;
means for tagging the source files with the metadata to generate tagged files;
means for transmitting the tagged files over a network to an adaptable knowledge store;
means for storing the tagged files in the adaptable knowledge store, wherein both the metadata and the source files of the tagged files are searchable via a single search command.

9. The system of claim 8, further comprising means for transmitting the source files and the metadata from an external application to the storing means.

10. The system of claim 8, wherein the means for storing the tagged files comprises:
means for organizing the tagged files within the storing means; and
means for managing the tagged files within the storing means.

11. The system of claim 8, wherein the means for storing the tagged files comprises:
means for accessing the tagged files within the storing means;
means for searching the tagged files within the storing means;
means for securing access to the storing means;
means for registering application preferences;
means for automatically initiating a process to be executed within,the storing means upon the occurrence of a predetermined event;
means for archiving the tagged files within the storing means;
means for replicating the tagged files within the storing means; and
means for regulating data transfer between an external application and the storing means.

12. The system of claim 8, wherein the means for storing the tagged files comprises:
means for externally accessing the storing means; and
means for externally displaying files contained within the storing means.

13. A system for retrieving files from a data storage system, comprising:
means for submitting search parameters to the data storage system;
means for processing search parameters with a first search engine associated with a metadata datastore;
means for automatically providing first search results from the first search engine to a second search engine, wherein the first search results are a list of files;
means for processing search parameters and first search results with the second search engine associated with a source file datastore; and
means for returning results of the second search engine, wherein the results of the second engine are a subset of the list of files provided by the first search engin.

14. A system for storing data comprising:
an adaptable knowledge store, wherein the adaptable knowledge store comprises a datastore comprising a dictionary electronically coupled with a relational database; and a file store electronically coupled with a file system;
one or more adapters coupled with the adaptable knowledge store, wherein the adapters link the adaptable knowledge store with external applications;
an application module coupled with the adaptable knowledge store; and
a user interface to provide access to the adaptable knowledge store via the application module through which the relational database and the file system are searchable via a single search command.

15. The system of claim 14, wherein the adaptable knowledge store comprises:
a core services module comprising a data access component; a search component; a security component; a registration component; an event component; an archiving component; a replication component; and a datalink component.

16. The system of claim 14, wherein the adaptable knowledge store comprises:
an external interface comprising access protocols and a display of data contained within the adaptable knowledge store.

17. The system of claim 14, wherein the adaptable knowledge store comprises:
a server comprising a first processor for providing remote access with the adaptable knowledge store and a second processor for monitoring the occurrence of an event.

18. A computer-readable medium having stored thereon a plurality of instructions, said plurality of instructions when executed by a computer, cause said computer to perform the following:

gathering source files from one or more applications;

providing metadata associated with the source files;

tagging the source data with the metadata to generate tagged files;

transmitting the tagged files over a network to an adaptable knowledge store;

storing the tagged files in the adaptable knowledge store, wherein both the metadata and the source files of the tagged data are searchable via a single search command.

19. The computer-readable medium of claim 18 having stored thereon additional instructions, said additional instructions, said plurality of instructions when executed by a computer, cause said computer to further perform transmitting the source files and metadata from an external application to the storing means.

20. The computer-readable medium of claim 18 having stored thereon additional instructions, said additional instructions, said plurality of instructions when executed by a computer, cause said computer to further perform:

organizing the tagged files within the storing means; and managing the tagged files within the storing means.

21. The computer-readable medium of claim 18 having stored thereon additional instructions, said additional instructions, said plurality of instructions when executed by a computer, cause said computer to further perform:

accessing data within the storing means;

searching data within the storing means;

securing access to the storing means;

registering application preferences;

initiating automatically a process to be executed within the storing means upon the occurrence of a predetermined event;

archiving data within the storing means;

replicating data within the storing means; and regulating data transfer between an external application and the storing means.

22. The computer-readable medium of claim 18 having stored thereon additional instructions, said additional instructions, said plurality of instructions when executed by a computer, cause said computer to further perform:

accessing from an externally application the storing means; and displaying externally the data contained within the storing means.

23. A computer-readable medium having stored thereon a plurality of instructions, said plurality of instructions when executed by a computer, cause said computer to perform the following:

submitting search parameters to the data storage system;

processing search parameters with a first search engine associated with a metadata datastore;

automatically providing first search results from the first search engine to a second search engine, wherein the first search results are a list of files;

processing search parameters and first search results with the second search engine associated with a source files datastore; and returning results of the second search engine, wherein the results of the second engine are a subset of the list of files provided by the first search engine.

\* \* \* \* \*